United States Patent
Chraim et al.

(10) Patent No.: US 11,388,073 B1
(45) Date of Patent: Jul. 12, 2022

(54) ESTIMATING END-TO-END LOSS DISTRIBUTIONS IN COMPUTER NETWORKS

(71) Applicant: Amazon Technologies, Inc., Seattle, WA (US)

(72) Inventors: Fabien Chraim, Wichita Falls, TX (US); John William Evans, Somer (GB)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/364,633

(22) Filed: Jun. 30, 2021

(51) Int. Cl.
*H04L 43/0829* (2022.01)
*H04L 43/0882* (2022.01)
*H04L 43/045* (2022.01)
*H04L 43/12* (2022.01)
*H04L 43/0817* (2022.01)

(52) U.S. Cl.
CPC ........ *H04L 43/0829* (2013.01); *H04L 43/045* (2013.01); *H04L 43/0817* (2013.01); *H04L 43/0882* (2013.01); *H04L 43/12* (2013.01)

(58) Field of Classification Search
None
See application file for complete search history.

(56) References Cited

U.S. PATENT DOCUMENTS

| | | | | |
|---|---|---|---|---|
| 7,362,709 | B1 * | 4/2008 | Hui | H04L 45/00 370/221 |
| 7,821,936 | B2 * | 10/2010 | Meloche | H04L 41/12 370/231 |
| 7,924,728 | B2 * | 4/2011 | Riga | G01D 21/00 370/238 |
| 8,289,845 | B1 * | 10/2012 | Baldonado | H04L 43/16 370/230 |
| 8,675,493 | B2 * | 3/2014 | Buddhikot | H04L 45/28 370/238 |
| 2004/0004938 | A1 * | 1/2004 | Buddhikot | H04L 45/12 370/238 |
| 2008/0049620 | A1 * | 2/2008 | Riga | H04W 56/004 370/236 |
| 2009/0028062 | A1 * | 1/2009 | Meloche | H04L 41/12 370/252 |
| 2013/0223229 | A1 * | 8/2013 | Hui | H04L 45/123 370/238 |
| 2015/0195212 | A1 * | 7/2015 | Vasseur | H04L 41/12 370/252 |

(Continued)

*Primary Examiner* — Ranodhi Serrao
(74) *Attorney, Agent, or Firm* — Klarquist Sparkman, LLP

(57) ABSTRACT

In computing networks, end-to-end loss distributions are estimated according to the present disclosure. The loss distributions may be calculated based on loss values reported by nodes in the network along an end-to-end communication path, which may be identified by a route tracing process. The loss values for each node in the path for a given time window may be reduced by a rounding process, and the reduced values for adjacent nodes in the path may be iteratively multiplied with one another in a pairwise manner to generate an end-to-end loss value vector, where the resulting product from each iteration may be reduced by the rounding process. A graphical or other representation of the values in the end-to-end loss value vector indicating a distribution of losses experienced along the path may be output via a user interface.

16 Claims, 8 Drawing Sheets

(56) References Cited

U.S. PATENT DOCUMENTS

2015/0333993 A1* 11/2015 Welin .................... H04W 24/08
370/252
2015/0382275 A1* 12/2015 Pragada .............. H04W 40/246
370/236

* cited by examiner

ESTIMATING END-TO-END LOSS DISTRIBUTIONS IN COMPUTER NETWORKS

BACKGROUND

Large computer networks, often used in cloud computing or other applications, may contain hundreds or thousands of network devices of several types, such as switches, routers, and hubs. Data from a source endpoint (e.g., a host computer or a network device connecting to another network) travels to a destination endpoint via paths defined by links between multiple devices of the network. In packet-switched networks, the data is formatted into units, termed packets, that travel along the paths between endpoints. Loss of traveling packets is a metric of service performance of the network. In particular, knowledge as to whether network packet loss is within the bounds of expectations provides an indication of the health of the network as well as whether an operator of the network is fulfilling service performance commitments to users or customers of the network. Knowledge of packet loss can also assist the network operator in identifying network performance issues that require repair.

In existing network systems, packet loss can be monitored by active monitoring or passive monitoring. In active monitoring, probe packets are sent end-to-end across the network. The number of probe packets successively delivered to a destination endpoint from a source endpoint are measured to provide a measure of packet loss along that source-destination path. However, such probe packets are sent at a relatively low rate compared to the real network traffic, and thus this approach under-samples the actual traffic and corresponding loss. As a result, active monitoring cannot provide an accurate method to measure end-to-end loss.

In contrast, passive monitoring relies on statistics of packet transmission and loss reported by each network device. In existing systems, the data from passive monitoring can be used to compile a traffic matrix, which represents the volume of traffic between all possible pairs of sources and destinations in the network. While passive monitoring provides an accurate measure of the loss rate at each network device, the information is limited to the corresponding network device. Thus, passive monitoring does not currently provide a measure of end-to-end path loss that would be experienced by traffic between a particular source-destination pair.

DETAILED DESCRIPTION

Figure 1:
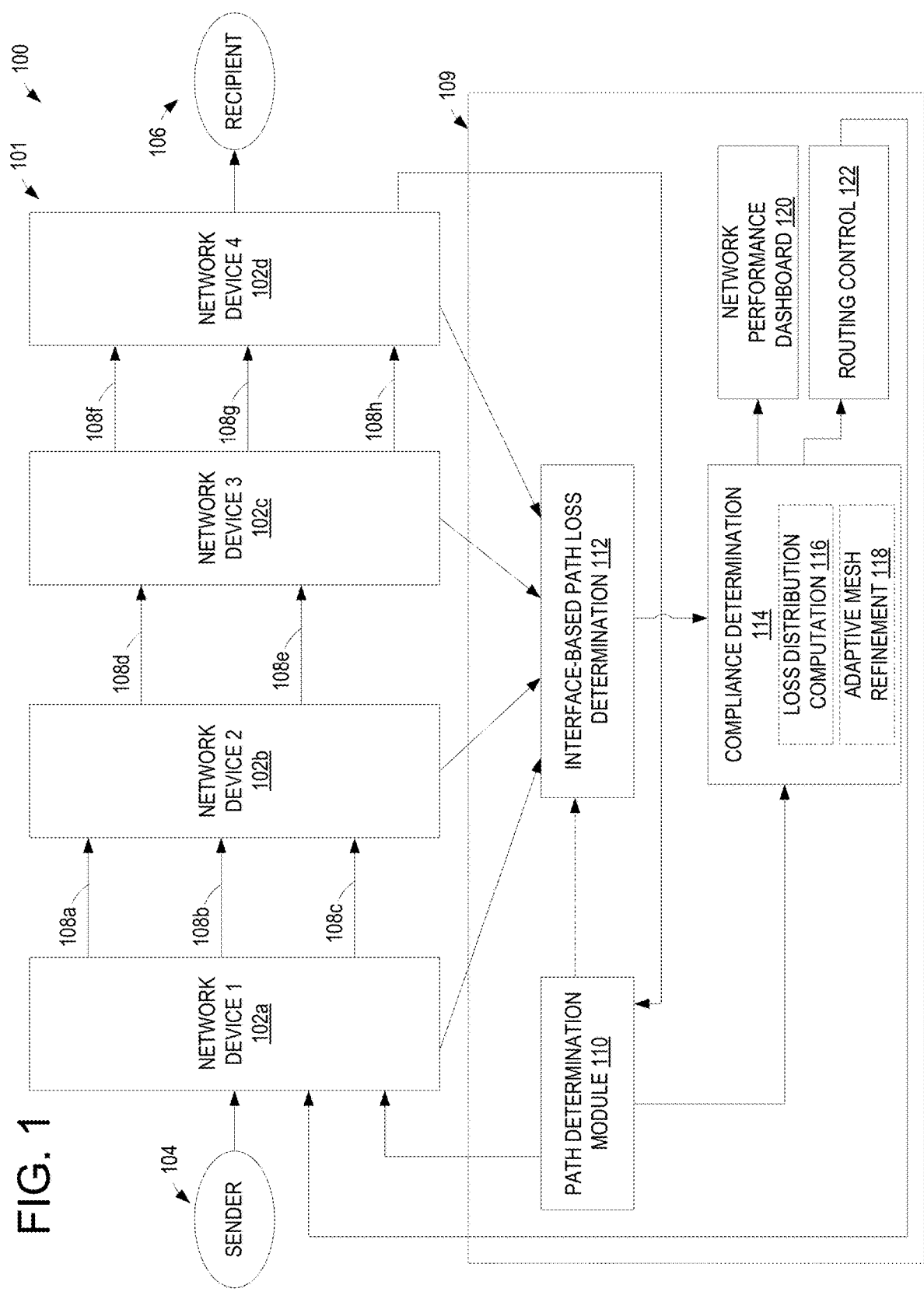
FIG. 1 is a block diagram of an example communications network in which end-to-end packet loss between two entities is estimated, in accordance with examples of the present disclosure.

Networks may provide service level agreements (SLAs) that define expected metrics for user experiences on the network, such as maximum end-to-end packet loss or end-to-end latency for network flow. The network flow may be defined in terms of customer service paths, where a service path defines types of services and pairs of path end points in the network. Accordingly, in order to improve adherence to an SLA, network monitoring, including the estimation of end-to-end losses along communication paths in the network, may be implemented to predict and/or identify issues in the network.

In order to measure the end-to-end service path loss rate along a communication path in the network, the loss rate at each network hop on the path may be measured. The network may be built wide, with multiple parallel devices for resilience and load balancing, hence each hop may include a set of devices which are forwarding-equivalent at Layer 3 of the Open Systems Interconnection model (OSI model), and which may be referred to as a container. Each service path pairing may include multiple underlying container paths. In turn, a container path may include multiple hops (e.g., 30 or more container hops) and each container may have multiple interfaces (e.g., up to 10,000 interfaces). The performance of the service path can therefore be measured as an aggregation of the performance of the underlying network containers and their interfaces. Accordingly, in order to quantify the performance of a service path, the disclosed methods and systems utilize a statistical model, as will be described in more detail below.

As described above, statistical models that only utilize information from probe packets may result in inaccurate views of the system due to undersampling, while statistical models that only utilize information from passive monitoring (e.g., reports of loss from each network device) may result in an incomplete view of the system due to a lack of understanding of end-to-end losses. Furthermore, in each of the above approaches, the information relating to the losses may be generalized by averaging the measured data to generate an estimation of loss in the network. However, when evaluating SLA compliance, a network management entity may be more concerned with outlier experiences rather than average experiences in order to have a more complete understanding of loss experienced by all users of the network.

In order to address the above-described issues, the disclosure describes technologies that are used to estimate end-to-end service path losses in a network based on loss distributions that are calculated based on measurements derived from a combination of passive and active monitoring, as described in more detail below. The estimate of packet loss can be used by an operator of the network to take corrective action, such as notifying a particular user of issues with data transmission to a particular destination, taking out of service network paths between particular source-destination pairs, or identifying particular network paths that would benefit from repair or further troubleshooting.

FIG. 1 illustrates an exemplary system 100 for estimating end-to-end path loss in a computer network 101. In the illustrated example, the computer network 101 includes four network devices 102a-102d that provide different physical interface combinations for sending packets between a sender 104 and a recipient 106. The computer network can be a geographically distributed collection of nodes (e.g., network devices 102) interconnected by communication links and segments for transporting data between end nodes or endpoints (e.g., network device 1 102a and network device 4 102d), such as personal computers, servers, and workstations, connections to an external network (e.g., via border nodes), or other devices, such as sensors, etc. Each network device may include, for example, a network router or switch. Alternatively, each network device 102 can represent an interface of a network device, a container, and/or other hierarchical tier that aggregates interfaces of network devices. As used herein, interfaces refer to ports of the network device that provide connectivity to other devices of the network. As such, each network device may have multiple interfaces 108, for example, input ports and output ports. For example, network device 1 102a is shown as having three possible interfaces 108a-108c to network device 2 102b. Network device 2 102b is shown as having two possible interfaces 108d and 108e to network device 3 102c, which is shown as having three possible interfaces 108f-108h to network device 4 102d. It is to be understood that the number of devices and interfaces shown in FIG. 1 is provided as an illustrative example, and the disclosed approaches may be applied to networks having any number or combination of network devices and associated interfaces.

The network 101 illustrated in FIG. 1 can be any type of network, such as a local area network (LAN) or a wide area network (WAN). LANs typically connect nodes over dedicated private communication links located in the same general physical location, such as a building or campus. WANs typically connect geographically dispersed nodes over long-distance communication links, such common carrier telephone lines, optical light paths, Synchronous Optical Networks (SONET), Synchronous Digital Hierarchy (SDH) links, or Power Line Communications (PLC), and so forth. Various network architectures, such as Clos networks, can be used. For example, network 101 may constitute a LAN while an external network connected thereto may constitutes a WAN or an intervening network that connects network 101 to the Internet.

Continuing with the illustrated example of FIG. 1, there are 18 different interface combinations to send packets between the sender 104 and the recipient 106. A central network monitor or monitoring system 109 may be used to estimate end-to-end path losses according to one or more of the methods described herein. For example, in order to compute an end-to-end path loss between the sender and the recipient, path loss is computed for each one of the combinations and compared against a threshold path loss (e.g., defined by an SLA) to determine a percentage of compliance for the cardinality of combinations. Computing the path loss for each combination includes monitoring the network both actively (e.g., via a path determination module 110) and passively (e.g., via an interface-based path loss determination module 112), then combining the associated measurements (e.g., in a compliance determination module 114) as will be described in more detail below. The central network monitor 109 may be implemented via a distributed computing system and/or one or more dedicated computing systems (e.g., as instances running on servers in a cloud compute service). In some examples, the components included in central network monitor 109 may be implemented as a pipeline of connected distributed and/or singular computing systems.

The path determination module 110 performs one or more operations to determine paths between network devices in the network (e.g., to build paths between end points in the network). In some examples, the path determination module includes a trace route simulator that provides active path loss measurements by generating probe packets that are sent along the different paths in the network and optionally monitored to determine paths in the network and packet loss experienced along the paths. The path data for the probes may be output to the compliance determination module 114 to determine one or more end-to-end paths in the network, formed by path segments between devices/containers in the network. In some examples, the path determination module 110 receives information regarding the physical topology of the network and routing or forwarding logic of the network devices to determine end-to-end paths for data packet transmission, and passes the determined paths on to the compliance determination module 114. Alternatively or additionally, the path determination module 110 may determine end-to-end paths via simulation or algorithm, for example, by simulating routing behavior of the network based on routing or forwarding logic. The path determination module 110 may receive the topology and/or logic information from network 101, for example, via a separate communication link with a network-wide administration device (not shown) and/or from each network device 102 via the respective data communication links formed by interfaces 108. Alternatively or additionally, the path determination module 110 is configured to perform active probing of network 101 to determine packet travel paths from each source to each destination. For example, the path determination module 110 can employ a route-tracing function (e.g., traceroutes or tracert) for a particular source-destination (sender-recipient) pair.

The interface-based path loss determination module 112 receives measurement data from each network device 102 in the network. For example, each network device may include and/or be coupled to an agent or other component configured to observe and output data regarding an amount of packets transmitted and an amount of packets lost (e.g., packets dropped or otherwise not transmitted due to an error) at each interface of the network device to the interface-based path loss determination module 112. In order to derive the interface losses, each network device may count all packets dropped on all interfaces and divide this value by the sum of all packets transmitted and dropped to generate a loss rate of the network device. Additional examples of calculating network device (e.g., container) loss representing losses across the interfaces of a network device are described below with respect to FIG. 3. The network devices and/or associated agents may compile and transmit the information regarding the losses periodically (e.g., every minute; where measured data is timestamped to indicate a time at which each data point is measured/calculated) and/or responsive to a request from the monitoring system 109. For example, the agents/network devices 102 and network management system 109 can operate in accordance with Simple Network Management Protocol (SNMP) and/or the agents/network devices may be configured to transmit data to the management system 109 automatically according to a schedule (e.g., by streaming telemetry).

The interface-based loss determination module 112 may combine the interface losses reported by each of the network devices along a targeted communication path, based on the path data generated from the path determination module 110, to derive a path loss indicating an estimation of packet loss for the targeted communication path. Examples of calculating the path losses are described below with respect to FIG. 3. The path losses calculated by the interface-based path loss determination module 112 may be output to the compliance determination module 114.

In some examples, the path loss determination module 112 calculates a transmission success rate for each network device 102 along the determined end-to-end path between the source and destination, where the transmission success rate is the probability that a packet will be successfully transmitted by the network device in a measurement interval. For example, the transmission success rate can be given as the ratio of the number of packets successfully transmitted by the network device in a measurement interval (or a corresponding packet transmission rate) to the total number of packets handled by the network device in the measurement interval (or a packet handling rate). The total number of packets handled by the network device can be given by the sum of the number of packets successfully transmitted and the number of packets lost by the node during the measurement interval. The path loss determination module 112 then compiles the individual transmission success rates from each network device along the end-to-end path to estimate the probability of successful transmission on the end-to-end path. For example, the probability of successful transmission on the end-to-end path can be determined as the product of the individual transmission success rates from each network device along the end-to-end path. The path loss determination module 112 can then estimate the probability of packet loss on the end-to-end path, for example, by taking the complement of the probability of successful transmission (e.g., (probability of packet loss)$_{PATH}$=1−(probability of successful transmission)$_{PATH}$). In some examples, the path loss determination module 112 can periodically (e.g., every minute) re-estimate the probability of packet loss, for example, based on updated data from the network devices 102 and/or updated end-to-end paths from path determination module 110, so as to provide a substantially real-time or near real-time analysis of network loss conditions.

The path loss determination module 112 and/or the compliance determination module 114 may combine packet transmission and loss data for each interface within a network device to determine a transmission success rate that applies to the entire network device, and then combine the transmission success rates for each network device to determine a transmission success rate for the end-to-end communication path. In some examples, the path loss determination module 112 and/or the compliance determination module 114 may provide a measure of end-to-end packet loss for multiple paths between a particular source-destination pair. For example, for each of end-to-end path that exists between the sender and the recipient (e.g., 18 paths in the illustrated example), the path loss determination module 112 and/or the compliance determination module 114 may calculate the probability of successful end-to-end transmission and then calculate the probability of end-to-end packet loss as otherwise described above. The path loss determination module 112 and/or the compliance determination module 114 may calculate a percentage of the potential end-to-end paths between the sender/recipient pair that comply with a predetermined acceptable loss threshold (e.g., having a probability of packet loss that is less than or equal to a target percentage). The path loss determination module 112 and/or the compliance determination module 114 may return the percentage as the measure of the probability of end-to-end packet loss (e.g., 90% of available end-to-end paths between the source-destination pair comply with the acceptable loss threshold). Alternatively or additionally, the path loss determination module 112 and/or the compliance determination module 114 may return an indication of those end-to-end paths that fail to comply with the acceptable loss threshold.

As described above, calculating an average of path losses may result in an inaccurate or incomplete view of losses experienced by users of the network. Further, the data provided by the path determination module 110 and the interface-based path loss determination module 112 may include path/interface loss measurements over a range of time (e.g., different measurements/calculations associated with different time points in the range). In order to leverage the above-described time-based data to achieve a more complete picture of path losses experienced by users of the network, the compliance determination module 114 may include a loss distribution computation module 116. The loss distribution computation module 116 may be configured to generate a representation (e.g., a graphical representation) of the distribution of losses experienced along a path over time and/or to use the distribution of losses to calculate other metrics, such as a percent of users that experience loss that exceeds a threshold (e.g., defined by an SLA). Examples of representations that may be output by the loss distribution computation module 116 and/or associated with data calculations made by the module 116 are described in more detail below with respect to FIGS. 4-6.

The compliance determination module 114 may further include an adaptive mesh refinement module 118. As described above, the number of container hops along a path and/or the number of interfaces per containers may be very large in some instances, resulting in an exponentially larger number of interface combinations for the path. In order to increase the viability of performing the above-described computations with minimal loss in accuracy, the mesh refinement module 118 may be used to group interfaces with similar loss profiles (e.g., loss values, vectors, distributions, etc.) together and adaptively summarize the loss at each interface group with greater precision for particular ranges of losses (e.g., losses that are significantly below the threshold may be summarized with less precision; losses that are above a threshold target loss may be summarized with more precision than losses that are closer to zero than to the threshold target loss).

For example, as described above, for a given time range, multiple values of loss may be provided for a given interface between network devices (e.g., originating from measurements from the path determination module 110 and/or the reports from the network devices compiled at the interface-based path loss determination module 112, each of which may generate loss values for multiple points in time within the time range). In order to simplify the calculation, the values of interface loss used for calculating the end-to-end path loss estimation may be reduced in a pairwise and/or stepwise manner, stepping through the path in an iterative manner (e.g., two hops at a time). For example, in FIG. 1, the interface/container losses for network device 1 102a may include a first amount of different loss values (e.g., 12000 in a non-limiting example) based on the measurements from the modules 110 and/or 112 and associated calculations, while the interface/container losses for network device 2 102b may include a second amount of different loss values (e.g., 7000) based on measurements from the modules 110 and/or 112 and associated calculations. The first and second amounts may be adaptively summarized as a much lower number (e.g., 30 values and 15 values, respectively) using a rounding process that rounds measured loss values to a nearest decimal point configured to achieve a target number of loss values.

For example, as described above, the rounding process may provide adaptive mesh refinement, in which some values are rounded with a lower precision than other values (e.g., values indicating losses below 0.01% may all be rounded to 0%, while values indicating loss above 0.01% may be rounded to a third decimal place; in other examples additional levels of granularity in rounding precision may be used for different range of values). The rounding process may have parameters that are based on a region of interest of the data (e.g., a region of loss values of interest, which may be based on a target threshold loss as defined in an SLA in some examples) and a total number of quantization levels to be used (e.g., based on an amount of computing resources available to perform the rounding process). For example, a higher number of quantization levels may be used within the region of interest (e.g., region of the data that is near and/or higher than the target threshold loss) than outside the region of interest (e.g., region of the data that is much lower than the target threshold loss or near zero).

As these two values still represent a large number of values for the interface combinations between the two devices (e.g., 450 different values of loss), the values are multiplied together (e.g., the losses for the first network device and the second device are represented by respective vectors of loss values, and the dot/Cartesian product of the vectors is calculated) and then rounded again as described above to reduce the interface combinations to a still lower number (e.g., 50 different values of loss) that represent losses experienced at network devices 1 and 2. This pairwise process may be repeated until the path is complete; for example, the loss values for network device 3 102c are reduced and then multiplied (e.g., the dot/Cartesian product is calculated) by the reduced (e.g., 50) values of loss for network devices 1 and 2, and the resulting loss values are further reduced by the rounding described above to ensure that the total number of values being used to generate the end-to-end path estimation do not exceed a threshold (e.g., 50 values).

Upon calculating the estimation of end-to-end path losses and/or otherwise calculating related metrics as described above, indications of this data may be output to a network performance dashboard 120 to enable a management entity to view statistical information relating to the operation of the network and identify issues in the network. For example, the graphical representations shown in FIGS. 4 and 5 may be shown via the dashboard, and/or tables of loss information may be presented via the dashboard. For example, the dashboard may include a graphical user interface configured to cause display of information based on the calculations/computations of the compliance determination module 114.

The information from the compliance determination module 114 may additionally or alternatively be output to a routing control module 122, which allows for an automated adjustment of operation of the network in response to calculated losses in the network. For example, if the calculations from the compliance determination module 114 indicate that more than a threshold number of users passing packets through one of the network devices experience more than a threshold amount of packet loss, the routing control may cause future traffic to selectively avoid the network device and/or may adjust and/or control traffic flow to decrease flow through the network device in an attempt to increase overall throughput in the network.

For example, network performance dashboard 120 may be a user interface that receives the measures of the probability of end-to-end packet loss for source-destination pairs from monitoring system 109. The user interface can allow an operator or provider of network 101 to take corrective action or to confirm that the network 101 meets performance level standards established by a service agreement with a customer of the network 101. For example, the measure can alert an operator to sender/recipient pairs that may experience elevated loss. The operator can thus alert a customer or user, who is the source of or the destination for the impacted traffic flow, about the degraded performance. Alternatively or additionally, the operator can put a portion of the network 101 impacted by the estimated end-to-end loss out of service, for example, to force customer traffic to pass through another part of the network or to allow for repair or troubleshooting. In another example, dashboard 120 and/or routing control 122 can be an alarm module that receives the measures of the probability of end-to-end packet loss for source-destination pairs from network monitoring system 109. Based on the data from the network monitoring system, the alarm module can automatically detect which end-to-end paths are non-compliant (e.g., have probabilities of end-to-end packet loss that exceeds a predetermined threshold value) and/or if traffic along an end-to-end path is anomalous (e.g., probability of end-to-end packet loss has increased significantly compared to a normal level, even if it may not exceed the predetermined threshold value). The alarm module may take corrective action based on the automatic detection and/or provide a notification to an operator of the network or to a customer affected by the degraded end-to-end performance. Other downstream systems or services that can interact with network monitoring system 109 are also possible according to one or more contemplated examples.

Figure 2:
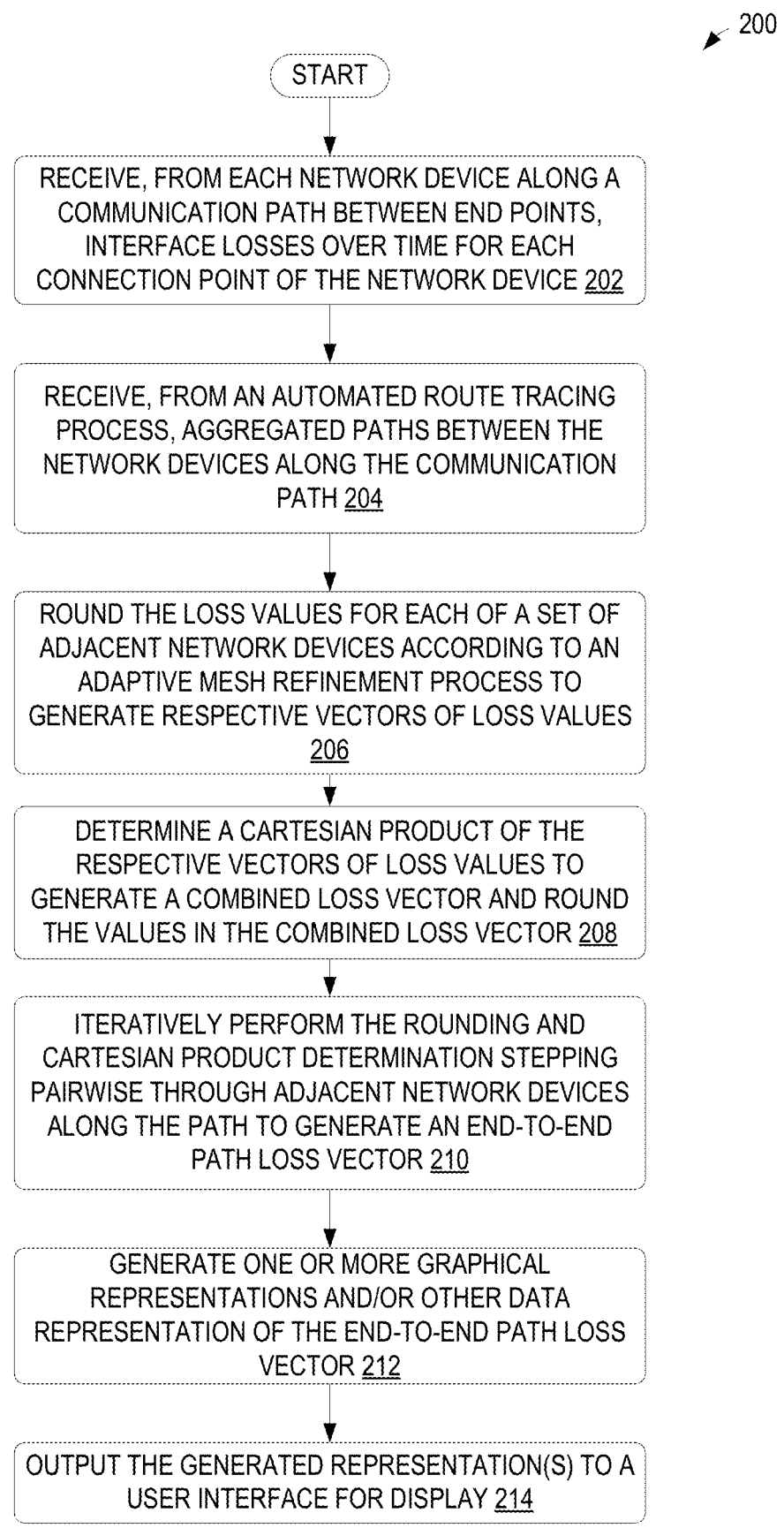
FIG. 2 is a flow chart of an example method for estimating end-to-end packet loss in a communications network, in accordance with examples of the present disclosure.

FIG. 2 is a flow chart of an example method 200 for estimating end-to-end loss along a communication path between multiple network devices in a computer network. In some examples, method 200 may be performed by a computing system included in and/or communicatively coupled to a monitored network. For example, method 200 may be performed by one or more computing systems operating as one or more of the components 110-122 of FIG. 1. At 202, the method includes receiving, from each network device along a communication path between end points, interface losses over time for each connection point of the network device. For example, the interface losses may be time-stamped to allow an association between a given loss value and a time at which the loss was recorded/measured. As described above with respect to FIG. 1, the term "network device" may refer to a hierarchical tier of a computing network, and may include a container and/or a plurality of physical devices that provide interfaces for communication links to one or more other tiers of the network.

At 204, the method includes receiving, from an automated route tracing process (e.g., path determination module 110 of FIG. 1) aggregated paths between the network devices along the communication path. For example, the aggregated paths may indicate connections between network devices that may serve as segments along the end-to-end path and/or possible interface connection combinations between network devices along the end-to-end path.

At 206, the method includes rounding the loss values for each of a set of adjacent network devices according to an adaptive mesh refinement process to generate respective vectors of loss values. For example, each of the interface losses reported for all of the interfaces of a first network device along the path (e.g., a network device closest to a sender and/or an originating network device) may be rounded as described above with respect to the adaptive mesh refinement module 118 to reduce the number of values representing loss experienced by the device over a time window. The reduced number of values may be stored as a vector of loss values for later calculations. A similar process may be used to generate a vector of loss values for a next, adjacent network device along the path.

At 208, the method includes determining a Cartesian product of the respective vectors of loss values to generate a combined loss vector and round the values in the combined loss vector (e.g., according to the adaptive mesh refinement process) to further reduce the number of values in the combined loss vector. As described above, the combined loss vector, after rounding, may be configured (e.g., by selection of the rounding parameters) to have fewer than a threshold number of loss values (e.g., 50 values).

At 210, the method includes iteratively performing the rounding and Cartesian product determinations, stepping pairwise/stepwise through adjacent network devices along the path to generate an end-to-end path loss vector. For example, the losses for the next/subsequent device along the path may be reduced by the rounding described above, and a Cartesian product of the corresponding vector of those losses and the rounded combined loss vector determined at 208 may be determined and further rounded to have fewer than the threshold number of loss values. These steps may be repeated for each remaining network device along the path, where the final Cartesian product (after rounding) corresponds to the end-to-end path loss vector. In this way, the method includes, in some examples, determining a Cartesian product of the respective vectors of loss values of a first pair of adjacent nodes in the path to generate a combined loss vector, rounding values in the combined loss vector according to the adaptive mesh refinement process, iteratively generating subsequent combined loss vectors by stepping pairwise through adjacent nodes along the path, determining Cartesian products for the respective vectors of loss values for each node along the path with a previous combined loss vector for an associated adjacent node along the path, and rounding values in the subsequent combined loss vectors, to generate an end-to-end path loss vector.

At 212, the method includes generating one or more graphical representations and/or other data representations of the end-to-end path loss vector. At 214, the method includes outputting the generated representations to a user interface for display. For example, a graph plotting the distribution of losses over time may be generated at 212 (e.g., an example of which is described below with respect to FIG. 4), a graph plotting cumulative loss distribution for a given time point may be generated at 212 (e.g., an example of which is described below with respect to FIG. 5), and/or any other representation of the loss data may be generated and output at 214 to a dashboard (e.g., the dashboard 120 of FIG. 1) or other user interface to alert a management entity for the network of the losses on the network. The output may include an alert (e.g., an alert that is displayable, audible, etc.) to a user, administrator, management entity for the network, and/or other related system/individual. The generated data may also include instructions usable to control a routing controller (e.g., routing control 122 of FIG. 1) to adjust traffic flow in the network based on the end-to-end path loss estimation data generated at 212. In additional or alternative examples, data aggregates generated based on the end-to-end path loss estimation data generated at 212 may be used to alter the topology and/or configuration of the network to increase performance of the network over time. In still further examples, information relating to or derived based on the end-to-end path loss estimation data generated at 212 may be communicated to customers in order to set customer expectations and/or otherwise inform the customer of network performance and/or may be used to set or adjust Service Level Agreements (SLAs) for users of the network. For SLAs that are already in place, the data generated at 212 may be used to verify whether the SLA has been met and, in applicable cases, to determine an amount of credit or other compensation to be issued to affected users in response to not meeting the SLA.

As noted above, practical network implementations may involve hundreds or thousands of nodes and/or endpoints, which may require substantial computing power to estimate end-to-end traffic flows and losses. Thus, in some examples, similarly situated interfaces can be grouped together and treated as a single entity for purposes of estimating packet losses in order to reduce computational resources required.

In some examples, a topological network map or hierarchical aggregation graph can be assembled for each node of the network and corresponding interfaces between nodes. The graph is generally a topological rank of network devices and/or interfaces based on an attribute such as aggregation level; that is, the network monitoring system may assemble the aggregation graph and rank containers in the graph as having greater or lesser degrees of aggregation. For example, a device may be ranked based on the number of other network devices it is in relation to "within", "beneath" or "above" other network devices. Thus, in some instances, devices with lower levels of hierarchical aggregation may be referred to as "downstream" relative to devices with higher levels of hierarchical aggregation, which may be referred to as "upstream" based on the aggregation of hierarchical communication channels.

The network topology may be abstracted to any one or more aggregated network topologies based on the various classifications of network devices and/or interfaces in the hierarchical aggregation. In some examples, hierarchical aggregation of the network devices into containers may include computing a hierarchical graph that includes all the valid aggregations (permutations) of the network devices, interfaces, and/or containers from an edge or a host to a highest topological layer. In an example, the highest topological layer may correspond to the largest aggregation area, for example, a building containing all the network devices. The network devices may be grouped into a respective container based on similarity among the network devices. Alternatively or additionally, the network devices are grouped together based on one or more attributes including, but not limited to, a device type, a device function, and a geographic location. The type of device may include manufacturer details, functionality, and hardware and/or software (e.g., software version) configuration of the device. Alternatively or additionally, the network devices may also be arranged into different hierarchical layers based on the one or more attributes. For example, a layer in the hierarchical graph may include one or more firewalls, while a lower layer may include all the routers connected with the one or more firewalls.

Based on the aggregated network topology for the network devices, a corresponding aggregated topology can be generated based on interfaces of the network devices. For example, interfaces of network devices can be hierarchically aggregated together into "containers" based on a desired level of aggregation and spatial arrangement of the network devices (e.g., the existing organization of the network devices in different layers of the network into respective containers). In some examples, the aggregation of interfaces into containers is based on neighbor information from each interface. For example, if a first network device is assigned to a first container (e.g., container A in a first layer) and has an interface that connects to a second network device assigned to a second container (e.g., container B in a second layer), then the interface for the first network device would be assigned to a container representative of that connection (e.g., container A→B). If, however, the first network device and the second network device both belong the same container (e.g., container A in the first layer), then that container is associated with the interface.

Figure 3:
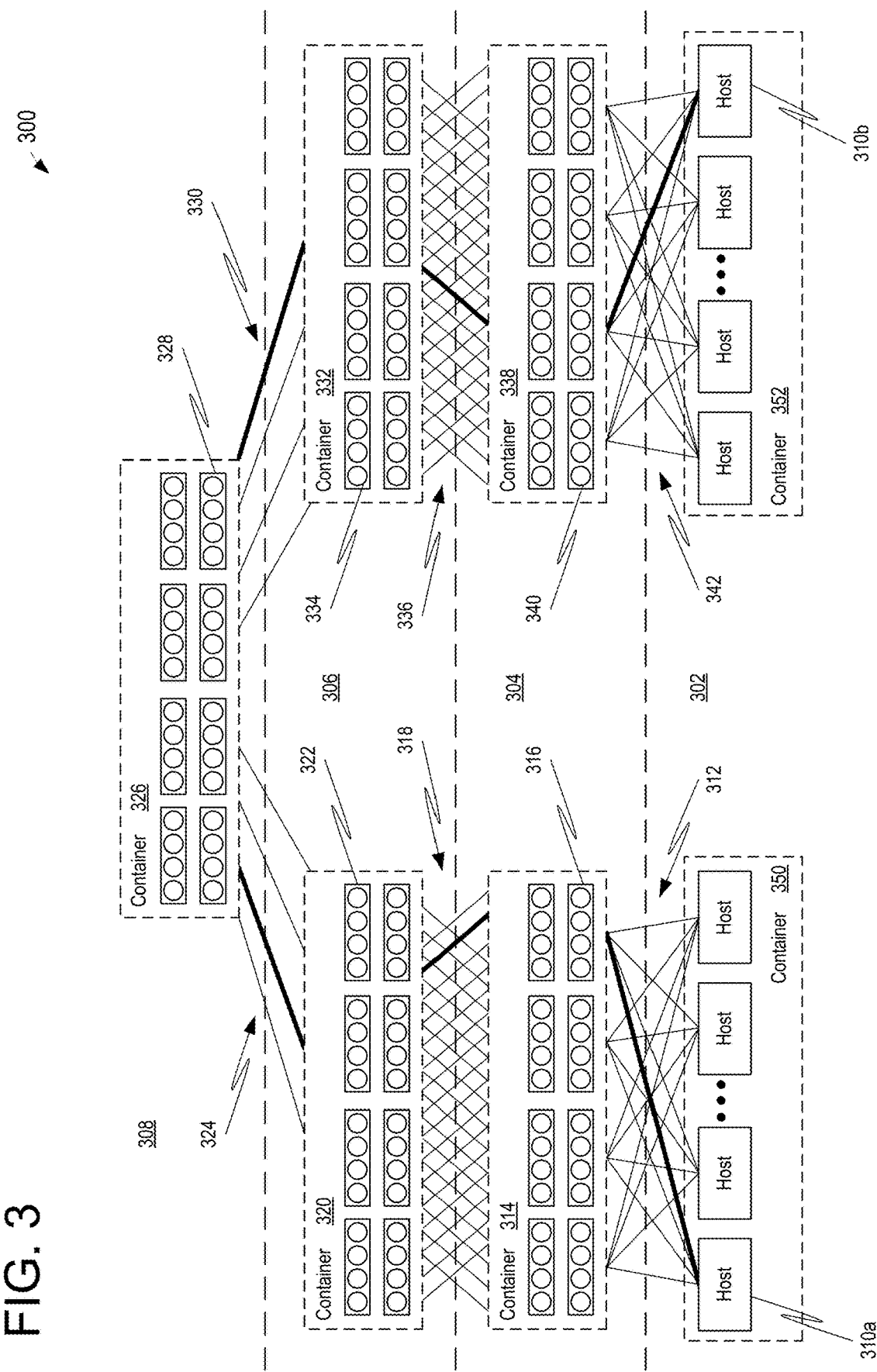
FIG. 3 is a block diagram of another example communications network in which end-to-end packet loss is estimated, in accordance with examples of the present disclosure.

Different aggregation levels may result in different assignments of interfaces to containers. For example, an interface may cross containers at a first aggregation level and otherwise be contained within a single container at higher aggregation levels. FIG. 3 illustrates an exemplary computer network 308 that may include and/or be included in a system 300 for estimating end-to-end path losses within the network. For example, the computer network 308 may represent a network being monitored via the components 110-122 of FIG. 1 performing method 200 of FIG. 2. FIG. 3 further shows an exemplary hierarchical aggregation of interfaces into containers at a first level of aggregation. The hierarchical aggregation of interfaces can be based on the physical topology of the network (e.g., the network layer 302-308 where the network device resides) as well as its connection between network layers (e.g., link connects to a same container in an adjacent level).

In the illustrated example of FIG. 3, all of the links 318 from interfaces 316 in container 314 connect to respective interfaces 322 in container 320, and all of the links 324 from interfaces 322 in container 320 connect to respective interfaces 328 in container 326. Similarly, all of the links 336 from interfaces 340 in container 338 connect to respective interfaces 334 in container 332, and all of the links 330 from interfaces 334 in container 332 connect to respective interfaces 328 in container 326. The hosts in layer 302 may also be aggregated into respective source or destination containers. For example, hosts 310a (e.g., a source or destination endpoint) can be aggregated together as container 350, which is connected to interfaces 316 in container/hierarchical layer 304 via respective links 312, while hosts 310b (e.g., a source or destination endpoint) can be aggregated together as container 352, which is connected to interfaces 340 in container 338 via respective links 342.

Measuring the availability of a container (e.g., any of containers 314, 320, 326, 332, 338, 350, 352) may rely on the packet transmission and loss experienced at each physical interface. Since data from agents of the network devices may contain both physical and virtual interfaces (e.g., port channels and other aggregations), the data from the interfaces can be filtered based on their properties. Data regarding total packets transmitted and lost by each interface in the container in a particular time period (e.g., each minute) can be sent by the respective agent to a central monitor, e.g., network monitoring system 109 of FIG. 1.

As illustrated in FIG. 3, the number of paths between any two endpoints may be large due to path redundancy for resilient design. To determine a path that traffic may take between a particular source-destination pair, a route-tracing function of an active monitoring module of the network can be used. For example, for traffic from source host 310a to destination host 310b in FIG. 3, the bolded path may be taken by packets traversing the network. By performing a route-trace (e.g., traceroute) for this source-destination pair and extracting the containers seen along this route, a "container path" can be obtained. The sequence of containers and corresponding container links is representative of the customer traffic between the two network endpoints. This assumes that if route-tracing function traverses a particular set of container links between two network endpoints, then all of the interfaces in those containers are reachable by the customer traffic between those endpoints. By understanding the current state of the network and its routing logic, the assumption can be validated or invalidated. The aggregation into containers thus involves capturing the route-tracing functions for a particular type of end-to-end network traffic and then aggregating network devices or interfaces thereof along the captured paths into respective containers as well as container links. The captured paths may be aggregated spatially. In some examples, additional endpoints adjacent to containers on the paths can be included if the containers have additional interfaces that do not otherwise present in the route-tracing functions.

As an alternative to route-tracing in order to aggregate interfaces into containers, or in addition thereto, container paths can be obtained by building a hierarchical graph (similar to FIG. 3) from the network topology and traversing the graph from leaf to leaf based on knowledge of the routing rules within the network. As an alternative to using routing rules of the network, the container paths can be approximated by computing shortest paths on the hierarchical graph, although this may oversimplify traffic patterns and/or remove important edge cases. For each pairing of source-destination endpoints (e.g., source host 310a and destination host 310b), a number of unique paths aggregated to the various levels of the hierarchy can be obtained.

Once the container paths are obtained, transmission success rate and/or packet loss rate at each container hop can be determined and used in the estimation of end-to-end packet loss. In some examples, the container-level packet loss rate (the complement of which defines the container-level transmission success rate) can be determined by treating the container as a single interface. For example, the loss rate of the container can be obtained by counting all packets lost on all interfaces of the container and normalizing by the sum of all packets handled by all of the interfaces of the container. For a container with N interfaces, the container-level loss rate can be given by:

$$ContainerLoss = \frac{\sum_{i=1}^{N} discards_i + errors_i}{\sum_{i=1}^{N} discards_i + errors_i + packetsOut_i}.$$

In other examples, the container-level packet loss rate can be determined by averaging interface losses across the container. For example, for a container with N interfaces, the container-level loss rate can be given by:

$$ContainerLoss = \frac{\sum_{i=1}^{N} InterfaceLoss_i}{N}.$$

The container-level loss rate for each container along the end-to-end path can be combined by taking the complement of the probability of success of transmission of a packet from end to end. For example, for a path with M container hops, the estimated probability of end-to-end packet loss can be given by:

$$PathLoss = 1 - \prod_{i=1}^{M}(1 - ContainerLoss_i).$$

Alternatively or additionally, the container-level loss rate for each container can be combined to provide the probability of end-to-end packet loss, for example, by taking the product of the individual container-level loss rates. Alternatively, the transmission success rate of each container can be obtained in a similar manner, for example, by counting all packets transmitted by all interfaces of the container and normalizing by the sum of all packets handled by the all of the interfaces of the container. An end-to-end transmission success rate can then be determined as the product of individual container-level transmission success rates, and the probability of end-to-end packet loss can be determined as the complement to the end-to-end transmission success rate (i.e., probability of end-to-end packet loss=1−transmission success rate).

In order to make the data representative of the customer experience, the output of the determinations may be grouped by service path. For example, based on information from a route tracing process (e.g., path determination module 110 of FIG. 1), service path combinations may be grouped to form different end-to-end paths, and the probability of end-to-end packet loss for each service path combination may be calculated (e.g., using the pairwise rounding/Cartesian product calculations described above at 206-210 of FIG. 2).

A network loss SLA for each pairing of network end points may be derived by collecting a number of samples, and computing the mean and standard deviation of the end-to-end loss for each pairing. After selecting a z-score (e.g., a confidence score) for a one-sided test, the SLA may be expressed as:

$$SLA_{pairing} = meanPairingLoss + z_{score} \times stdPairingLoss.$$

In some examples, the probability of end-to-end packet loss can be returned, for example, as an output of the network monitoring system 109 of FIG. 1. In other examples, the probability of end-to-end packet loss can be compared with a predetermined threshold (e.g., an acceptable packet loss rate of X %) to derive a measure of path compliance (e.g., to an SLA derived based on prior measurements according to the calculations described above).

Although five containers are illustrated in FIG. 3, examples of the disclosed subject matter are not limited thereto. Rather, fewer or additional hierarchical levels and/or fewer or additional containers are also possible depending on a desired level of aggregation as well as the number of network layers, the number of network devices, and available interface connections. For example, the hosts 310 may not be included in respective containers, and the end-to-end path loss estimation may be performed up to hierarchical layer/container 304 (e.g., the paths between container 314 and container 350 may not be considered or may be generalized based on another estimation process/reporting mechanism) to determine the end-to-end path loss from container 326 to one of the hosts 310a/310b. Accordingly, in some examples, the operations described herein may be performed to estimate losses in a portion of a path between edge/end nodes in a network, and the end-to-end path referred to herein may be defined as the path between any two selected nodes (or containers, etc.) in a network.

Figure 4:
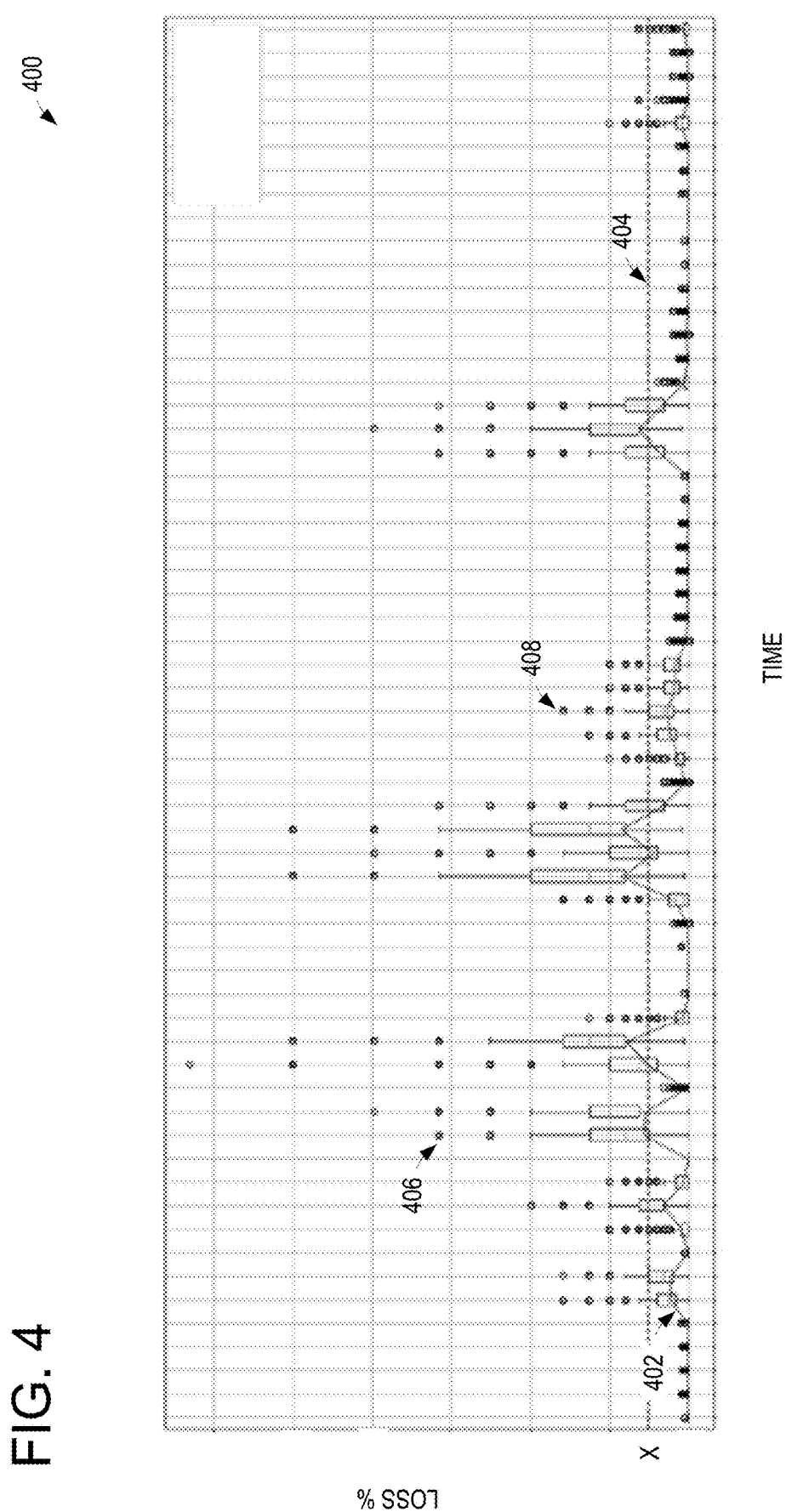
FIGS. 4-5 show example graphical representations of estimated path loss that are output via a dashboard, in accordance with examples of the present disclosure.

FIG. 4 shows an example plot 400 of a distribution of loss between end points in a network at different points in time. The line shown at 402 shows estimates of path loss derived from averaging the losses reported from the containers along the paths between the end points and the losses derived from probes traveling the paths. As shown, these estimations, when viewed alone, indicate that the container is largely compliant with the target loss X (shown at 404) for an example Service Level Agreement (SLA). However, the distribution of the losses (e.g., range of user experiences) experienced at each given time point, an example of which is shown at 406, provide a clearer picture of the actual experiences of the packets traveling along those paths. For example, according to the averaging plot, the network was above the target loss at approximately 6 time points (e.g., close to one tenth of the time points), and in each case was over the target by a very small amount. However, the distribution plots show that much higher loss was experienced during at least one transmission for many more time points (e.g., over a third of the time points), and, in many cases, for a much higher amount.

Figure 5:
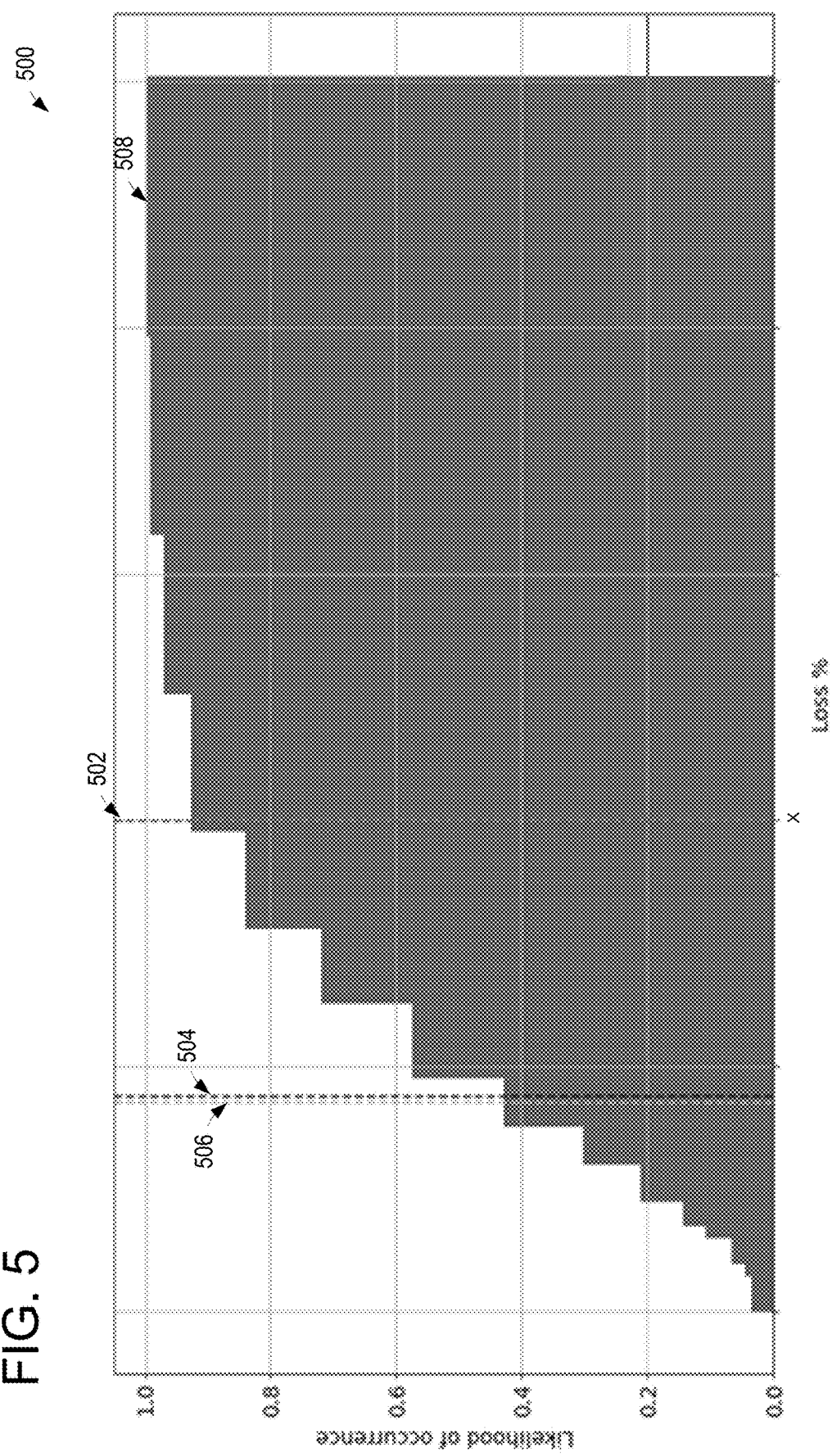

FIG. 5 shows an example plot 500 that illustrates a resulting cumulative distribution of loss at a particular minute (shown at 408) of the events captured in FIG. 4. The x-axis for plot 500 represents the end-to-end loss and the y-axis represents the probability (0 to 1) of a user of the network experiencing this level of loss. The first dashed line 502 represents the SLA target of X % loss, and the second dashed line 504 represents the output of a loss estimation routine in which average loss rate is calculated at each container along the path (e.g., counting all packets dropped on all interfaces and dividing by the sum of all packets transmitted and dropped; then calculating path loss rate from the loss rate of all containers on the path as an indication of the experience of an average packet traveling between the end points). The third dashed line 506 represents the output of a loss estimate routine in which the loss for each interface is calculated and then the mean interface loss across all interfaces in each container is calculated as an indication of an average loss experience for a user that transmits packets between the end points. The shaded region 508 shows the cumulative likelihood of occurrence of different percentages of packet loss for the given minute, based on the distributions identified in the plot 400 for the target time point 408. The shaded region shows that approximately 10% of users experienced an end-to-end loss exceeding the target max loss of X %.

Figure 6:
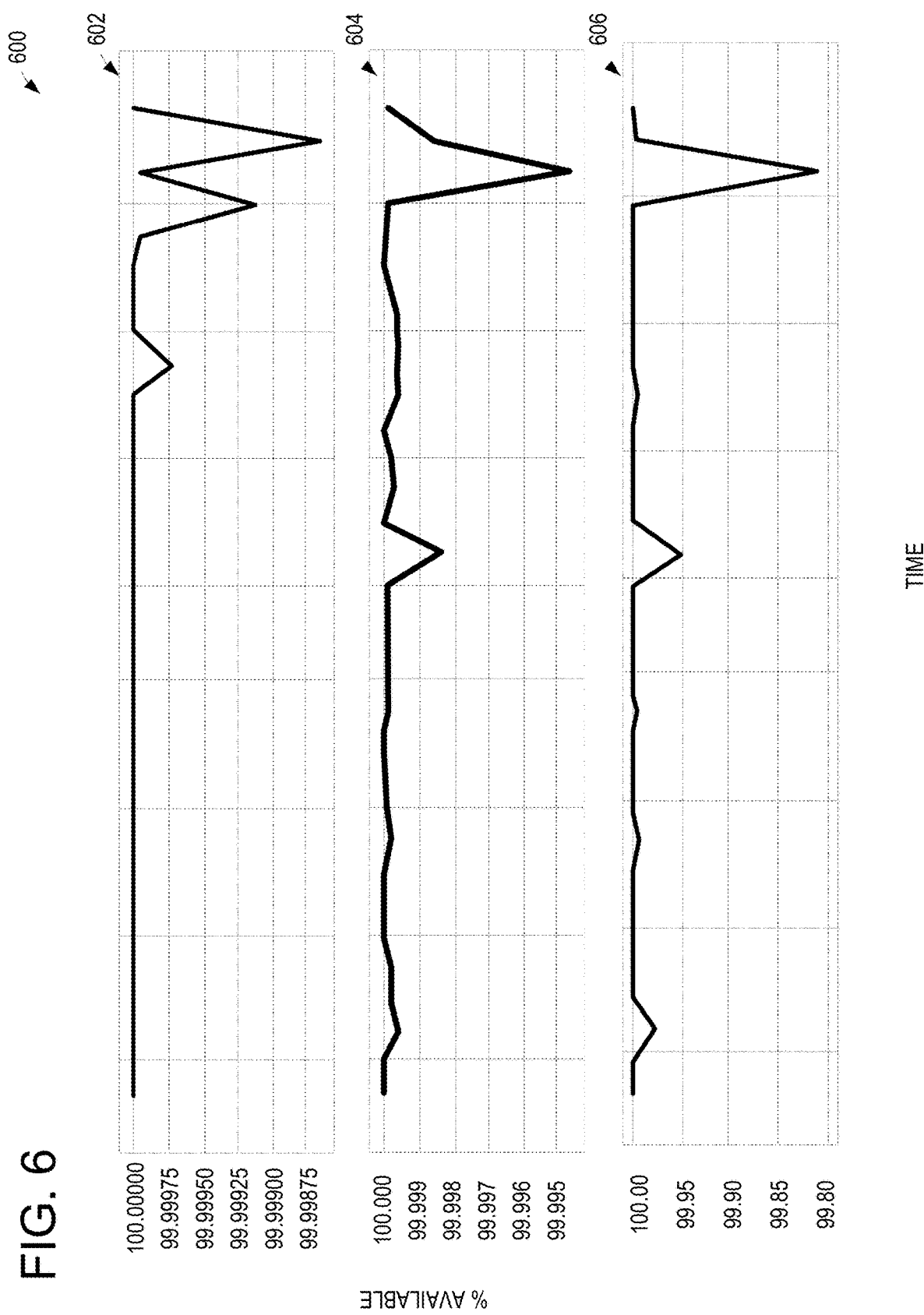
FIG. 6 shows an example plot of estimated network availability based on different processes for estimating end-to-end packet loss in a network.

FIG. 6 shows an example plot 600 that illustrates example outputs of network availability over long time periods (e.g., days) calculated by different approaches: output 602 shows estimated availability based on average loss calculations (e.g., averaging the loss experienced at each container per unit time, and averaging these values for each day represented in the plot), whereas outputs 604 and 606 shows estimated availability based on an aggregation of the data generated according to method 200 of FIG. 2, with differences in how the data generated via method 200 is compiled over time.

For output 604, the data is aggregated to provide a mean service path availability. For example, the data generated via method 200 is used to determine a percentage of the path minutes for which the loss rate is less than the threshold out of the total number of path minutes in a period. For example, if a service path includes 10 pairings each with a single possible path, over a day there are 10*1*1,440=14,400 pairing minutes. A compliance value of 99.5% means that 0.995*14,400=14,328 of all pairing minutes for that service path had loss rate within target during that day.

For output 606, a per-pairing compliance is calculated for all pairings of containers in a service path. The p95 or p99 of the per-pairing (non-)compliances are determined and defined as the service path availability. For example, an availability value of 99.4% indicates that 95% of pairings for a border service path will have more than 99.4% of their daily path minutes below the loss target. In this way, the output 606 captures outliers that may be missed when calculating according to the mechanism described above to generate output 604.

The examples shown and described above with respect to FIGS. 4-6 are understood to be non-limiting examples of graphical outputs based on end-to-end path loss estimations derived using the mechanisms described herein and with respect to FIGS. 1 and 2. Other example data representations may be provided via a user interface (e.g., network performance dashboard 120 of FIG. 1) to inform users of network performance. An example table format showing thirty-day average and minimum daily availability of the network for different service paths is shown below in Table 1. In some examples, the availability measurements (e.g., the average and minimum values) may be presented in different colors or other effects to indicate a distance from a target loss percentage (e.g., measurements that are well within a target loss as defined for an SLA are shown in green; measurements that are well outside of the target loss are shown in red; measurements between are shown in various gradients such as light green, yellow, orange, etc.).

| Service Path | Pairing Type | Average | Minimum |
|---|---|---|---|
| Path 1 | Type 1 | 99.7628 | 99.7284 |
| Path 2 | Type 1 | 99.7714 | 99.7389 |
| Path 3 | Type 1 | 99.9967 | 99.9724 |
| Path 4 | Type 1 | 99.9992 | 99.9981 |
| Path 5 | Type 1 | 99.9993 | 99.998 |

Figure 7:
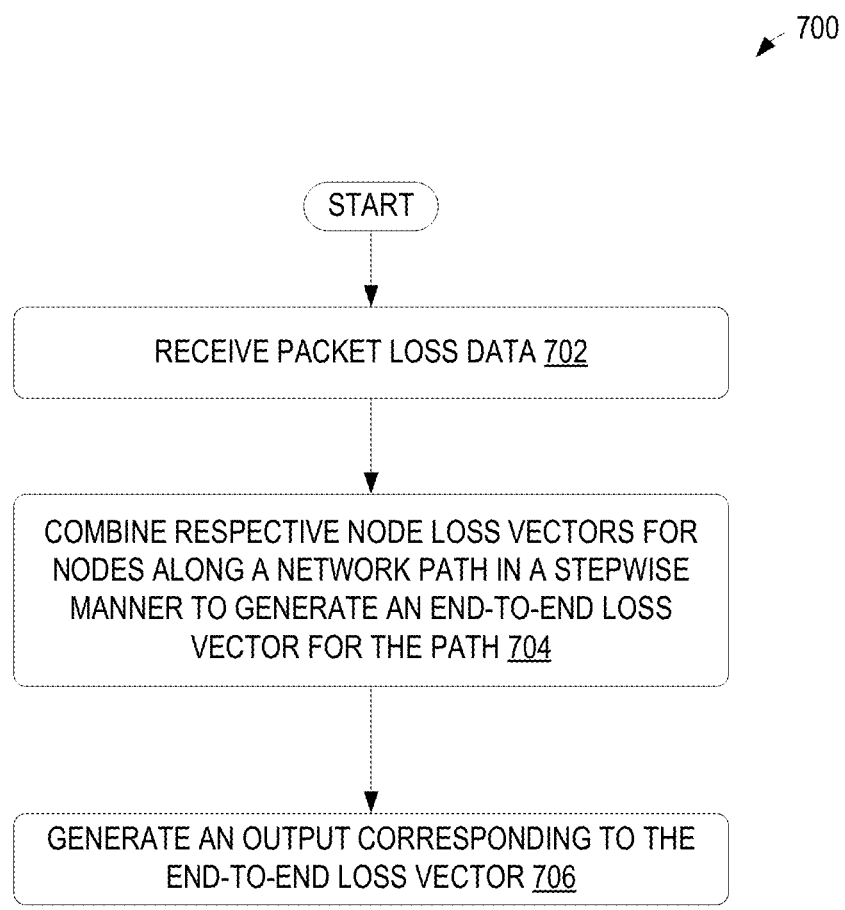
FIG. 7 is a flow chart of an example method for combining loss distributions to generate an estimate of an end-to-end loss along a network path.

FIG. 7 is a flow chart of an example method 700 for combining loss distributions to generate an estimate of an end-to-end loss along a network path. In some examples, method 700 may be performed by a computing system included in and/or communicatively coupled to a monitored network. For example, method 700 may be performed by one or more computing systems operating as one or more of the components 110-122 of FIG. 1. At 702, the method includes receiving packet loss data. For example, packet loss data for each interface of each node in an end-to-end communication path through a network may be received. The packet loss data may include loss values indicating a respective amount of lost packets at each interface of each node in the path. The loss values may be calculated by any of the mechanisms described herein (e.g., including those calculations described above with respect to FIGS. 1 and 3).

At 704, the method includes combining respective node loss vectors for nodes along a network path in a stepwise manner to generate an end-to-end loss vector for the path. For example, each respective node loss vector may indicate a distribution of the loss values received for the respective node. In some examples, the node loss vector includes a distribution of measured loss values taken during a sample period of time and/or sampled across a plurality of measurement phases (e.g., where packet travel through the network may be simulated in each measurement phase by sending probe packets along the end-to-end path and/or where loss values of real traffic travelling along the end-to-end path may be measured during the measurement phases). As described in more detail above with respect to FIG. 2, the loss values in the respective node loss vectors and/or in vectors resulting from the stepwise combinations performed at 704 may be rounded (e.g., according to an adaptive mesh refinement algorithm) to reduce computational load of the combining.

At 706, the method includes generating an output corresponding to the end-to-end loss vector. The generated output may be used for alerting/notifying users and/or administrators of end-to-end losses via transmission of associated information/control instructions to targeted systems. For example, the targeted systems may include a graphical user interface for presenting one or more graphical representations of the estimated data (e.g., examples of which are described above with respect to FIGS. 4-6) and/or for alerting a user/administrator of end-to-end losses, which may prompt the user/administrator to adjust the network and/or network operations. In other examples, the generated output may be used for automatically controlling a targeted system (e.g., a system providing a user interface for a user/administrator/network manager/etc., a system configured to control the network and/or network operations, etc.) for network control or network operational changes. For example, the output may be configured to control the targeted system to perform an action relating to an estimation of a percentage of users and/or network communication sessions experiencing end-to-end losses along the path (e.g., based on the generated end-to-end loss vector). Examples of actions and/or adjustments to the network are described above and include, but are not limited to, changing a topology of the network, changing routing and/or traffic flow through the network, adjusting SLAs for new and/or existing users of the network, etc.

Figure 8:
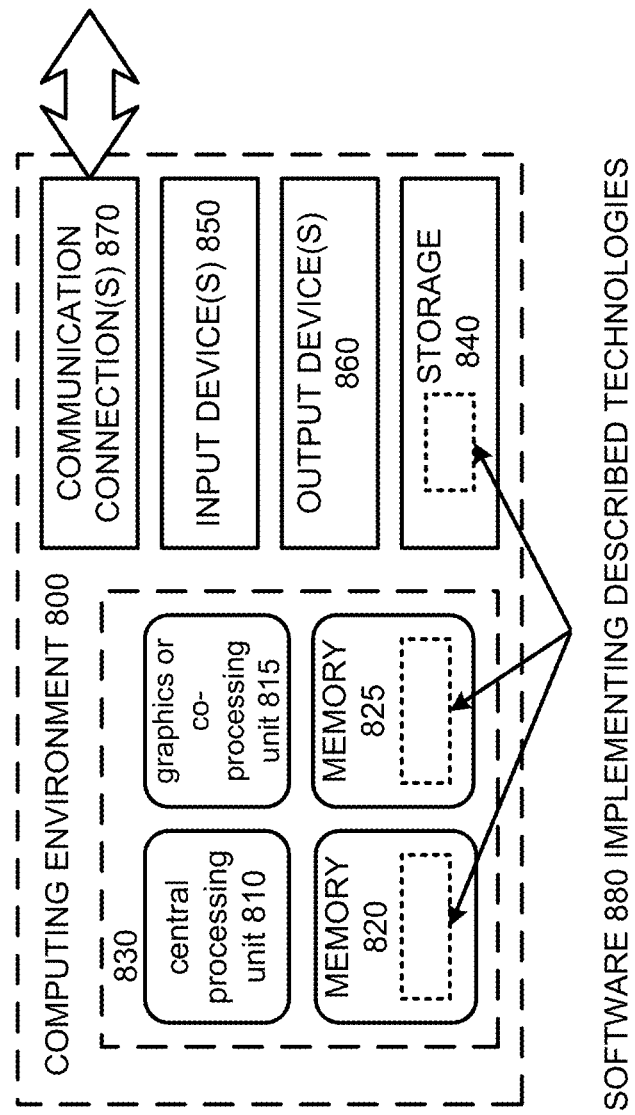
FIG. 8 depicts a generalized example of a suitable computing environment in which the described innovations are implemented according to some examples of the disclosure.

FIG. 8 depicts a generalized example of a suitable computing environment 800 in which the described innovations are implemented, in some examples. For example, the computing environment 800 is included in and/or includes one or more of the components of system 100 of FIG. 1 and/or system 300 of FIG. 3. in some examples. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 includes, in some examples, volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). For example, the computer-executable instructions suitable for execution by the processing unit(s) described above are used to perform the methods described herein (e.g., including method 200 of FIG. 2) and/or the functionality of the components of the systems described herein (e.g., monitoring system 109 of FIG. 1, etc.).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 is, in some examples, removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein. For example, the computer-executable instructions suitable for execution by the processing unit(s) described above are used to perform the methods described herein (e.g., including method 200 of FIG. 2) and/or the functionality of the components of the systems described herein (e.g., the monitoring system 109 of FIG. 1, etc.).

The input device(s) 850 is, in some examples, a touch input device such as a keyboard, mouse, pen, or trackball, a voice input device, a scanning device, or another device that provides input to the computing environment 800. The output device(s) 860 is, in some examples, a display, printer, speaker, CD-writer, or another device that provides output from the computing environment 800. The input device(s) 850 and output device(s) 860 are utilized, in some examples, to provide and/or interact with a user interface in accordance with one or more of the described technologies, including the network performance dashboard 120 of FIG. 1.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier. For example, the communication connection(s) 870 enable communication between the components of FIG. 1 (e.g., to allow packets or other data to be transmitted between devices 102 and components of monitoring system 109 of FIG. 1 and/or between containers 314, 320, etc. of FIG. 3).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system comprising:
a network monitoring system coupled to a network comprising a plurality of nodes including end points of an end-to-end communication path, the network monitoring system comprising:
one or more processors, and
one or more non-transitory computer-readable storage media storing instructions executable by the one or more processors to:
receive, from an automated route tracing process, aggregated paths between the end points of the path corresponding to an end-to-end path through the network;
receive, from each node along the path, interface loss values indicating interface losses experienced over time for each connection point of the node;
round the interface loss values for each node in the path according to an adaptive mesh refinement process to generate respective vectors of loss values;
determine a Cartesian product of the respective vectors of loss values of a first pair of adjacent nodes in the path to generate a combined loss vector;
round values in the combined loss vector according to the adaptive mesh refinement process;
iteratively generate subsequent combined loss vectors by stepping pairwise through adjacent nodes along the path, determining Cartesian products for the respective vectors of loss values for each node along the path with a previous combined loss vector for an associated adjacent node along the path, and rounding values in the subsequent combined loss vectors, to generate an end-to-end path loss vector;
generate a graphical representation of the end-to-end path loss vector; and
output, via a graphical user interface, the generated graphical representation.

2. The system of claim 1, further comprising generating instructions to control traffic flow in the network based on the end-to-end path loss vector and outputting the instructions to a routing controller for the network.

3. The system of claim 1, wherein the automated route tracing process is configured to determine the end-to-end path through the network by sending a probe packet through the network between the end points and monitoring pathing taken by the probe packet through the network.

4. The system of claim 1, wherein the generated graphical representation includes a plot of distributed loss percentages experienced on the end-to-end path for a plurality of time points.

5. The system of claim 1, wherein each node comprises a container of multiple interfaces, and the instructions are further executable to group the interfaces into respective containers based on loss profiles of the interfaces.

6. A method comprising:
receiving packet loss data for each interface of each node in an end-to-end communication path through a network, the packet loss data including loss values indicating a respective amount of lost packets at each interface of each node in the path;
in a stepwise manner for each node along the path, combining respective node loss vectors of the nodes to generate an end-to-end loss vector, each respective node loss vector indicating a distribution of the loss values received for the respective node; and
generating an output corresponding to the end-to-end loss vector, the output configured to control a targeted system to perform an action relating to an estimation of a percentage of users or network communication sessions experiencing end-to-end losses along the path,
wherein combining the respective node loss vectors comprises iteratively determining respective Cartesian products of the respective loss vectors or combinations of the respective loss vectors in the stepwise manner, and, in each iteration, rounding loss values in a result of the determined Cartesian product according to an adaptive mesh refinement algorithm.

7. The method of claim 6, further comprising receiving path data from a trace route simulator configured to send probe packets through the network to determine a network topology, wherein the end-to-end communication path is determined based on the path data.

8. The method of claim 6, further comprising processing the end-to-end loss vector to calculate a distribution of losses along the path at each of a plurality of time points, and wherein the output comprises a graphical representation including a graphical plot of a cumulative loss distribution along the path in a single time point or a graphical plot of the distribution of losses along the path for display via a graphical user interface.

9. The method of claim 6, wherein the output comprises an alert or an instruction configured to adjust one or more of a routing of traffic through the network or a topology of the network based on the end-to-end loss vector.

10. The method of claim 6, further comprising rounding the loss values for each node in the path to reduce a number of loss values for each node and to generate the respective node loss vectors.

11. The method of claim 10, wherein the rounding of the loss values comprises performing an adaptive mesh refinement on the loss values.

12. The method of claim 11, wherein the loss values are rounded with greater precision for loss values that exceed a threshold loss target relative to loss values that are closer to zero than to the threshold loss target.

13. The method of claim 12, wherein the threshold loss target is defined by a Service Level Agreement (SLA) between a management entity for the network and a user of the network.

14. One or more non-transitory computer-readable storage media storing computer-executable instructions for causing a computing system to perform a method, the method comprising:
receiving packet loss data for each interface of each node in an end-to-end communication path through a network, the packet loss data including loss values indicating a respective amount of lost packets at each interface of each node in the path;
in a stepwise manner for each node along the path:
iteratively combining respective node loss vectors corresponding to the loss values for adjacent nodes in the path to generate a respective combined loss vector, and
rounding the loss values for the respective combined loss vectors, wherein a last respective combined loss vector determined for a last pair of adjacent nodes along the path is rounded to generate an end-to-end path loss vector;

determining an end-to-end path availability by aggregating end-to-end path loss vectors generated over a time window; and generating an output corresponding to the end-to-end path availability for transmission to or presentation by a target system, wherein determining the end-to-end path availability comprises calculating a per-pairing compliance for which loss rate is below a threshold target for all pairings of nodes in the end-to-end path, and wherein the threshold target is based on a Service Level Agreement (SLA) for services provided by the network.

15. The one or more non-transitory computer-readable storage media of claim 14, wherein determining the end-to-end path availability comprises calculating a percentage of path minutes for which a loss rate is below a threshold target out of a total number of path minutes in the time window.

16. The one or more non-transitory computer-readable storage media of claim 14, wherein the target system comprises a system for providing a user interface to display alerts relating to the end-to-end path availability or a system for controlling the network or operations of the network.

* * * * *